US009185725B2

(12) United States Patent
Kneckt et al.

(10) Patent No.: US 9,185,725 B2
(45) Date of Patent: Nov. 10, 2015

(54) REQUEST-RESPONSE PROCEDURE FOR WIRELESS NETWORK

(75) Inventors: Jarkko Kneckt, Espoo (FI); Mika Kasslin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 734 days.

(21) Appl. No.: 13/327,070

(22) Filed: Dec. 15, 2011

(65) Prior Publication Data
US 2013/0155933 A1   Jun. 20, 2013

(51) Int. Cl.
*H04W 84/18* (2009.01)
*H04W 74/00* (2009.01)
*H04W 8/00* (2009.01)

(52) U.S. Cl.
CPC ............ *H04W 74/002* (2013.01); *H04W 8/005* (2013.01); *H04W 84/18* (2013.01)

(58) Field of Classification Search
USPC ......................................................... 370/310
See application file for complete search history.

(56) References Cited

U.S. PATENT DOCUMENTS

| 2004/0267866 | A1* | 12/2004 | Carollo et al. ................. 709/200 |
| 2007/0025486 | A1  | 2/2007  | Gainey et al. |
| 2007/0140188 | A1  | 6/2007  | Meikote et al. |
| 2008/0031208 | A1* | 2/2008  | Abhishek et al. ............. 370/338 |
| 2009/0238132 | A1* | 9/2009  | Nabetani et al. ............. 370/329 |
| 2010/0165875 | A1  | 7/2010  | Kneckt et al. |
| 2010/0272066 | A1  | 10/2010 | Wang et al. ................... 370/331 |
| 2010/0316043 | A1* | 12/2010 | Doi et al. ....................... 370/350 |
| 2011/0040969 | A1  | 2/2011  | Yao et al. |
| 2013/0109314 | A1* | 5/2013  | Kneckt et al. ................ 455/41.2 |

FOREIGN PATENT DOCUMENTS

| EP | 2317687 A2 | 5/2011 | |
| JP | PCT/JP2008000151 | * 8/2008 | ............... H04B 7/26 |
| WO | WO-2010/086699 A1 | 8/2010 | |

OTHER PUBLICATIONS

Matta, S.; "Broadcast Probe Responses", IEEE Draft, vol. 802.11v, server date: Jul. 18, 2006, downloaded by EPO: Jun. 28, 2012, slides 1-9; EPOQUENET NPL: XP017686529; entire document, especially slides 2, 5-9.

Barber, P. et al.; "Broadcast Probe Response in TGai", IEEE Draft, vol. 802.11ai, server date: Nov. 7, 2011, downloaded by EPO: Jun. 28, 2012, slides 1-10; EPOQUENET NPL: XP017673191; entire document, especially slides 7-9.

Chóliz, J. et al.; "Architectures for Location Data Acquisition and Distribution in UWB Indoor Tracking Systems", $7^{th}$ Workshop on Positioning Navigation and Communication (WPNC); IEEE, 2010, pp. 206-214; ISBN 978-1-4244-7158-4; entire document, especially abstract; col. 4, lines 32-43; col. 7, lines 2-9.

(Continued)

*Primary Examiner* — Michael Thier
*Assistant Examiner* — Brian Cox
(74) *Attorney, Agent, or Firm* — Harrington & Smith

(57) ABSTRACT

This document provides a solution where a requesting wireless apparatus indicates in a probe request message that the requesting wireless apparatus supports a collision avoidance mechanism that enables a responding wireless apparatus to reduce a number probe response messages by responding to a plurality of probe response messages with a single probe response message.

17 Claims, 5 Drawing Sheets

(56) References Cited

OTHER PUBLICATIONS

Barber, P. et al.; "Broadcast Probe Response Including Normative Text", IEEE Draft, vol. 802.11ai, server date: Jan. 12, 2012, downloaded by EPO: Jun. 28, 2012, pp. 1-4; EPOQUENET NPL: XP017672912; entire document, especially p. 2, paragraph "Remedy".

IEEE Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications. Jun. 12, 2007, IEEE Computer Society, XP055124801, pp. 1-298.

* cited by examiner

REQUEST-RESPONSE PROCEDURE FOR WIRELESS NETWORK

FIELD

The invention relates to the field of radio communications and, particularly, to a request-response procedure in a wireless network.

BACKGROUND

Some wireless networks utilize active scanning in which a scanning device probes for other devices by transmitting a request message which obliges a responding device to respond. In the response, the scanning device gains information on the wireless network(s) available. Such a request-response procedure may be used as a preliminary procedure for a connection establishment.

BRIEF DESCRIPTION

According to an aspect of the present invention, there is provided a method comprising: acquiring, in a wireless apparatus a plurality of probe request messages originated from a plurality of requesting wireless apparatuses, each of the plurality of probe request messages comprising an information element that indicates that each of the plurality of requesting wireless apparatuses supports a collision avoidance mechanism; and in response to detecting that said information element comprised in the plurality of probe request messages and indicating said support for the collision avoidance mechanism, causing transmission of a probe response message that responds to the plurality of probe request messages.

According to another aspect of the present invention, there is provided a method comprising: causing, in a requesting wireless apparatus, transmission of a probe request message from the requesting wireless apparatus, wherein the probe request message comprises an information element that indicates that the requesting wireless apparatus supports a collision avoidance mechanism that enables a responding wireless apparatus to reduce a number probe response messages by responding to a plurality of probe response messages with a single probe response message; and acquiring, in the requesting wireless apparatus, a probe response message transmitted by a responding wireless apparatus as a response to the probe request message.

According to another aspect of the present invention, there is provided an apparatus comprising: at least one processor; and at least one memory including program instructions. The at least one memory and the computer program code are configured, with the at least one processor, to cause the apparatus to acquire a plurality of probe request messages originated from a plurality of requesting wireless apparatuses, each of the plurality of probe request messages comprising an information element that indicates that each of the plurality of requesting wireless apparatuses supports a collision avoidance mechanism; and in response to detecting said information element comprised in the plurality of probe request messages and indicating said support for the collision avoidance mechanism, cause transmission of a probe response message that responds to the plurality of probe request messages.

According to another aspect of the present invention, there is provided an apparatus comprising: means for acquiring a plurality of probe request messages originated from a plurality of requesting wireless apparatuses, each of the plurality of probe request messages comprising an information element that indicates that each of the plurality of requesting wireless apparatuses supports a collision avoidance mechanism; and means for causing, in response to detecting that said information element comprised in the plurality of probe request messages and indicating said support for the collision avoidance mechanism, transmission of a probe response message that responds to the plurality of probe request messages.

According to another aspect of the present invention, there is provided an apparatus comprising: means for causing transmission of a probe request message, wherein the probe request message comprises an information element that indicates that the apparatus supports a collision avoidance mechanism that enables a responding wireless apparatus to reduce a number probe response messages by responding to a plurality of probe response messages with a single probe response message; and means for acquiring a probe response message transmitted by a responding wireless apparatus as a response to the probe request message.

According to yet another aspect of the present invention, there is provided a computer program product embodied on a computer readable distribution medium, wherein the computer program product configures a processor to execute a computer process comprising: acquiring a plurality of probe request messages originated from a plurality of requesting wireless apparatuses, each of the plurality of probe request messages comprising an information element that indicates that each of the plurality of requesting wireless apparatuses supports a collision avoidance mechanism; and in response to detecting that said information element comprised in the plurality of probe request messages and indicating said support for the collision avoidance mechanism, causing transmission of a probe response message that responds to the plurality of probe request messages.

According to yet another aspect of the present invention, there is provided a computer program product embodied on a computer readable distribution medium, wherein the computer program product configures a processor to execute a computer process comprising: causing transmission of a probe request message from a requesting wireless apparatus, wherein the probe request message comprises an information element that indicates that the requesting wireless apparatus supports a collision avoidance mechanism that enables a responding wireless apparatus to reduce a number probe response messages by responding to a plurality of probe response messages with a single probe response message; and acquiring a probe response message transmitted by a responding wireless apparatus as a response to the probe request message.

Embodiments of the invention are defined in the dependent claims.

LIST OF DRAWINGS

Embodiments of the present invention are described below, by way of example only, with reference to the accompanying drawings, in which FIG. 1 illustrates an example of a wireless communication scenario to which embodiments of the invention may be applied;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
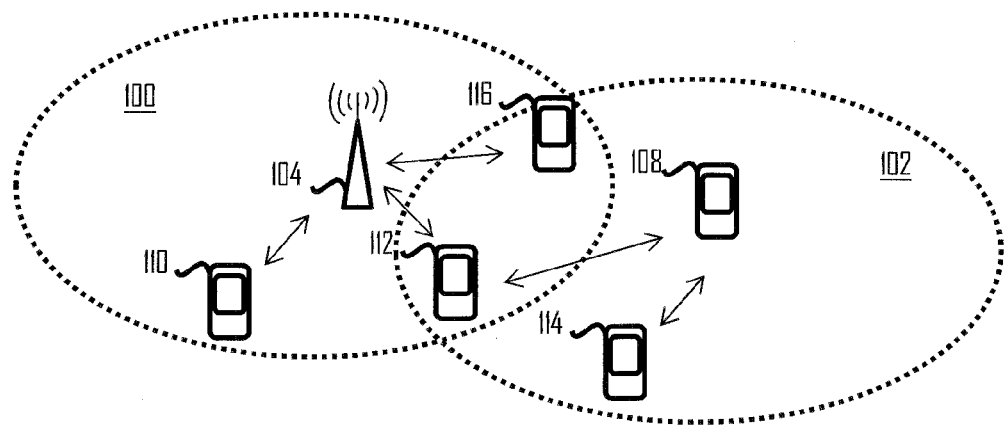

A general architecture of a wireless communication system to which embodiments of the invention may be applied is illustrated in FIG. 1. FIG. 1 illustrates groups of wireless communication devices forming wireless networks that may be referred to as basic service sets (BSS). A BSS may be defined by a group of wireless communication devices comprising an access point (AP) 104, 108 and one or more terminal stations (STA) 110, 112, 114, 116 communicating with the access points 104, 108 of their respective groups. A basic service set (BSS) is a basic building block of an IEEE 802.11 wireless local area network (WLAN), and it may have a determined coverage area 100, 102 defined by the coverage area of the AP 104, 108, for example. The most common BSS type is an infrastructure BSS that includes a single AP together with all associated, non-access-point STAs. The AP may be a fixed AP as AP 104, or it may be a mobile AP as AP 108. The APs 104, 108 may also provide access to other networks, e.g. the Internet. In another embodiment, at least one of the BSSs, is an independent BSS (IBSS) or a mesh BSS (MBSS) without a dedicated AP, e.g. the communication device 108 may in such an embodiment be a non-access-point terminal station. While embodiments of the invention are described below in the context of the above-described topologies of IEEE 802.11, it should be appreciated that other embodiments of the invention are applicable to networks based on other specifications, e.g. WiMAX (Worldwide Interoperability for Microwave Access), UMTS LTE (Long-term Evolution for Universal Mobile Telecommunication System), and other networks having cognitive radio features, e.g. transmission medium sensing features and capability to adopt operational parameters to enable coexistence with radio access networks based on different specifications and/or standards.

The BSSs are represented by the APs and/or STAs connected to each other, thereby establishing a BSS. Any one of the STAs 110 to 116 may establish a connection to any one of the APs, provided that the BSSs of the APs do not exclude the STAs from their list of devices allowed to connect to the BSSs, e.g. through shared key processes. In the mesh BSSs and/or independent BSSs (IBSS), arbitrary connections between devices are possible. The connection establishment may include authentication in which an identity of a STA is established in the AP. The authentication may comprise exchanging an encryption key used in the BSS. After the authentication, the AP and the STA may carry out association in which the STA is fully registered in the BSS, e.g. by providing the STA with an association identifier (AID) for frame transmissions.

The 802.11n specifies a data transmission mode in which a STA can have only one secondary channel which results in a maximum bandwidth of 40 MHz. The primary channel is used in all transmissions, and with associated devices supporting only the 20 MHz mode. The secondary channel may be used with clients supporting wider transmission bandwidths, wherein the primary channel communication is extended by using the secondary channel as additional bandwidth. A further definition in 802.11n is that the primary and secondary channels are adjacent. IEEE 802.11ac task group is developing an extension with a data transmission model to provide for wider bandwidths by increasing the number of secondary channels from 1 up to 7, thus resulting in bandwidths of 20 MHz, 40 MHz, 80 MHz, and 160 MHz.

The primary channel may be used for connection establishment leading to association between two wireless apparatuses between which the connection is to be established. A wireless apparatus preparing for the association may scan for channels in order to detect a signal indicating presence of another wireless apparatus for association. The wireless apparatus may be in a completely unassociated state or it may have at least one existing association while seeking for a new association. IEEE 802.11 network discovery mechanisms define two modes: passive and active scanning. In the passive scanning, the wireless apparatus scans a channel for a determined period of time. If a wireless network is discovered, the wireless apparatus may proceed to connection establishment or, otherwise, it tunes to another channel. The wireless apparatus may scan for beacon frames, measurement pilot frames, or any other frames detected. The frames may be originated from any AP or destined to any AP or, alternatively, the wireless apparatus scans for frames that meet given criteria e.g. a determined identifier, such that the wireless apparatus is able to detect any wireless network, including IBSSs and mesh BSSs. When the wireless apparatus uses the active scanning, it generates probe request frames and transmits them to request APs or, in general, other wireless apparatuses to reply with probe response frames. The rules applied to the requesting device (e.g. a STA) and the responding device (e.g. an AP) during the active scanning may be defined as follows. Upon tuning to a new channel, e.g. a new frequency channel, the requesting device may first scan the channel for a determined period of time, e.g. a probe delay, or until it detects a frame header, e.g. a physical layer convergence protocol (PLOP) header, on the channel. Thereafter, the requesting device may initiate a channel contention so as to gain a transmission opportunity for transmission of a probe request frame. The requesting device may transmit one or more probe request frames comprising information (for example, a service set identifier (SSID) field and/or a BSS identifier field) specifying which wireless apparatus may respond to the probe request. The requesting device may also reset a probe timer to zero and start it upon transmitting the probe request. If the requesting device detects no signal with sufficiently high energy on the channel on which the probe request was transmitted before the probe timer reaches a minimum probe response time, it tunes to a next channel if any. Otherwise, the requesting device may wait on the channel until the probe timer reaches a maximum probe response time and, thereafter, the requesting device processes all received probe responses. Optionally, the requesting device may then tune to scan the next channel, if any. The probing procedure provides the requesting device with information on the wireless networks present in the area and, as a consequence, enables the requesting device to select a wireless network with which to establish a connection. The responding device receiving the probe request may respond with a probe response if an address field in the probe request frame is a broadcast address, an individual medium access control (MAC) address of the responding device, or a multicast address of the responding device. Another condition may for providing the response is that the SSID in the probe request is a so-called wildcard SSID, the specific SSID of the responding device, or the specific SSID of the responding device is included in an SSID list element of the probe request. Yet another condition may be that the specific Mesh ID in the probe request is the specific Mesh ID of the responding device, or an address 3 field in the probe request is a wildcard BSSID, the BSSID of the responding device, or the MAC address of the peer device in a mesh BSS. Further conditions for responding to the probe request may also be set. In general, the probe request specifies the conditions defining the devices that should respond with the probe response. All devices that fulfil the conditions may attempt to transmit the probe response frame.

Figure 2:
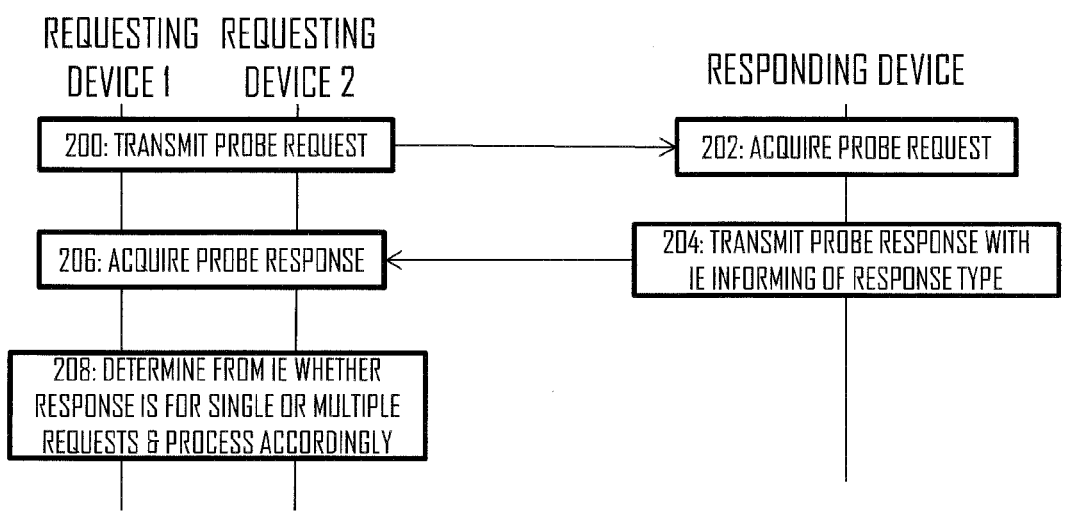
FIGS. 2 and 3 are signalling diagrams of processes for reducing the number of probe responses according to some embodiments of the invention.

FIG. 2 illustrates an embodiment of the invention for bundling probe responses so as to reduce signalling traffic in the wireless network of FIG. 1. FIG. 2 illustrates a flow diagram of a process for responding to a plurality of probe requests. FIG. 2 illustrates steps carried out in a requesting device, e.g. a STA 110 to 116 or even an AP 104, 108, and steps carried out in a responding device, e.g. an AP 104, 108 or a STA 108. As a consequence, it should be appreciated that some embodiments realize some aspects of the invention in the responding device, other embodiments realize other aspects of the invention in the requesting device, and yet other embodiments realize yet other aspects of the invention in a wireless communication system comprising the requesting device(s) and the responding device(s). The requesting device(s) and the responding device(s) may each comprise an apparatus comprising at least one processor and at least one memory including a computer program code, wherein the at least one memory and the computer program code are configured, with the at least one processor, to cause the apparatus to carry out the process in the requesting/responding device.

Referring to FIG. 2, requesting devices 1 and 2 carry out transmission of a probe request message in bock 200. Block 200 may be carried out independently in the requesting devices 1 and 2 and, optionally, in other requesting devices. Depending on the implementation, block 200 may comprise causing the transmission of the probe request message, e.g. triggering the transmission of the probe request message in the requesting device, or it may comprise also any analog and digital signal processing needed prior to emission of radio frequency energy carrying the probe request from an antenna of the requesting device. In block 202, the responding device acquires a plurality of probe request messages originated from a plurality of requesting devices, including the probe requests transmitted by the requesting devices 1 and 2. Depending on the implementation, block 202 may comprise reception of the probe request from a radio interface through an antenna of the responding device and/or any related analog/digital signal processing, or block 202 may comprise acquiring the probe request that has already been subjected to reception signal processing from a radio receiver or a memory of the responding device. In block 204, the responding device carries out transmission of a probe response message comprising an information element that indicates whether the probe response message is a probe response to a single probe request message or to a plurality of probe request messages. An embodiment of the structure of the information element is described in greater detail below but, in short, the information element enables the requesting device to determine from the probe response message that is not necessarily addressed directly to it, whether or not the probe response message is still intended to be received and extracted by the requesting device. Again, depending on the implementation block 204 may comprise causing the transmission of the probe response message, e.g. triggering the transmission of the probe response message in the responding device, or it may comprise also any analog and digital signal processing needed prior to emission of radio frequency energy carrying the probe response message from an antenna of the responding device.

In block 206, the requesting devices 1 and 2 acquire the probe response message transmitted by a responding device and comprising the information element that indicates whether the probe response message is the probe response to the single probe request message or to the plurality of probe request messages. In block 208, each requesting device determines from the information element whether the probe response message is the probe response to the single probe request message or to the plurality of probe request messages. If the information element indicates that the probe response message is the probe response to the plurality of request messages, block 208 may further comprise processing, by the requesting device 1, 2, the probe response message as a probe response that is related to the probe request message transmitted by the requesting device 1, 2 in block 200. On the other hand, if the information element indicates that the probe response message is the probe response to the single probe request message, at least one of the requesting devices may process the probe response message as a probe response that is not related to the probe request message transmitted in block 200. Further embodiments for processing the probe responses are described in greater detail below.

The above-described embodiment of the invention configures the responding device to respond to a plurality of probe request messages with a single probe response and to include in the probe response message the information element that indicates whether the probe response is a response to a single probe request or multiple probe requests. This reduces the number of probe responses and, thus, the signalling overhead. Furthermore, the information element enables the requesting devices to determine whether or not they should extract the probe response, as will be described in greater detail below. Another advantage is that the probability of collisions is reduced as the result of reduced amount of signalling traffic. Therefore, the embodiments may be considered as a collision avoidance mechanism. The embodiments also enable the devices other than the requesting device(s) to detect that the responding device is reducing the number of probe response messages, and this information may be used as measurement statistics in such devices.

Figure 3:
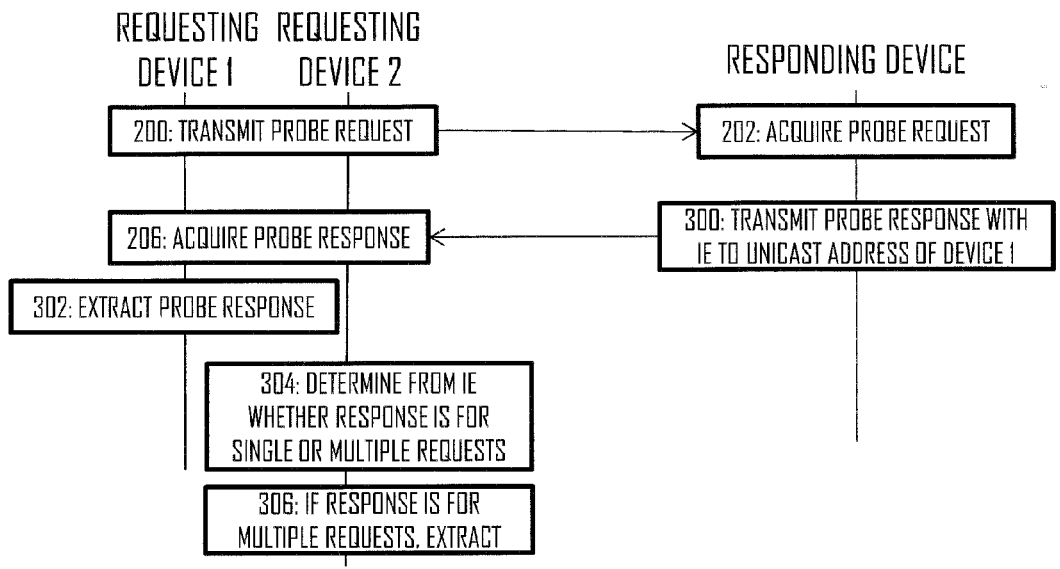

In an embodiment, the responding device is configured to transmit the probe response message to a unicast address of one of the requesting devices, while the other requesting devices may be addressed by the probe response indirectly through the above-mentioned information element, e.g. by setting the information element to indicate that the probe response is a response to the multiple probe requests. FIG. 3 illustrates such a process as an embodiment of the process of FIG. 2. Therefore, steps denoted in FIG. 3 by the same reference numbers as in FIG. 2 represent the same or similar functions. Accordingly, the requesting device(s) transmit the probe requests in block 200, and the responding device receives/acquires the probe requests in block 202. In block 300, the responding device inserts an address of the requesting device 1 into a receiver address field of the probe response. The receiver address field may be comprised in a medium access control (MAC) header of the probe response message. In the embodiment related to 802.11 networks, the address of the requesting device 1 may be added to Address 1 field. In block 206, the requesting devices 1 and 2 acquire the probe response message and extract the destination address of the probe response message. As the probe response message is addressed to the requesting device 1, the requesting device 1 may process the probe response in a conventional manner. Upon detecting that the probe response message is addressed to it, the requesting device 1 may extract contents of the probe response message in block 302.

In an embodiment, the requesting device 1 acknowledges the reception of the probe response message by transmitting an acknowledgment message to the responding device. An advantage in this embodiment is that it enables the responding device to indicate whether it responds to a single probe request or to multiple probe requests simultaneously and yet it receives, in the form of the acknowledgment message, verification about the correct reception of the probe response frame.

However, the requesting device 2 which is not the direct destination of the probe response message may process the probe response message according to the following embodiment. Upon detecting that the address of the requesting device 2 is not comprised in the receiver (MAC) address of the probe response message, the requesting device 2 may extract the above-mentioned information element so as to determine whether the probe response message is the response to the single or multiple probe requests (block 304). It should be appreciated that these two steps may be carried out in a reversed order, e.g. first determining the probe response type and then detecting the receiver address. If the information element indicates that the probe response message is the probe response to the multiple probe request messages, the process may proceed to block 306 in which the requesting device 2 extracts the probe response message so as to derive information on the wireless network of the responding device from the probe response message. On the other hand, if the information element indicates that the probe response message is the probe response to the single probe request message, the requesting device 2 may determine that it is not intended to extract the probe response message, and the requesting device 2 may discard the probe request message and continue to monitor for the probe response message that is intended to it.

Figure 9:
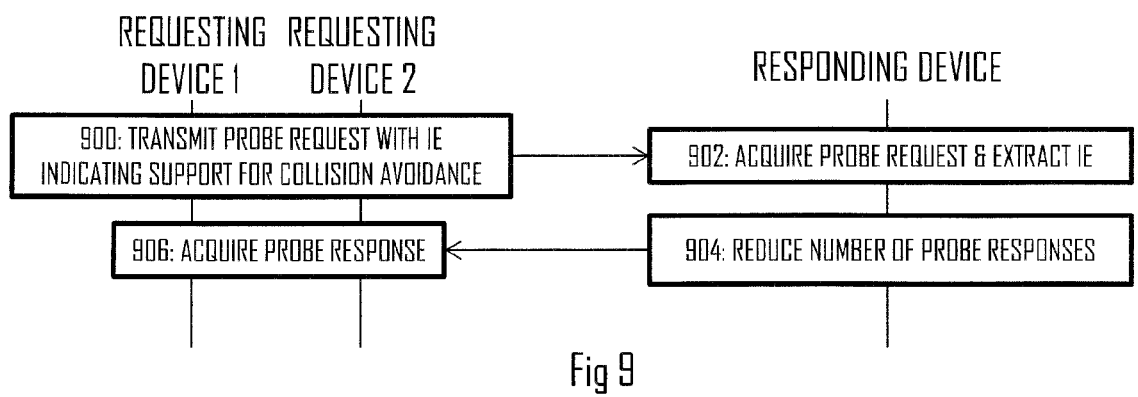
FIG. 9 illustrates a signalling diagram for a collision avoidance mechanism according to an embodiment of the invention.

Let us now consider some embodiments related to the format of the probe request and the probe response and, particularly, to new information elements included in the probe request and/or the probe response. In an embodiment, the requesting device 1, 2 may include in the probe request message an information element which indicates whether or not the requesting device supports the collision avoidance functionality where the responding device responds to multiple probe requests with a single probe response. FIG. 9 illustrates an embodiment of such a procedure. Referring to FIG. 9, a requesting device 1, 2 causes transmission of a probe request message in block 900. The probe request message comprises an information element that indicates that the requesting wireless apparatus supports a collision avoidance mechanism where a responding wireless apparatus reduces a number probe response messages by responding to a plurality of probe response messages with a single probe response message. Both requesting devices and, optionally, other requesting devices may carry out block 900 such that the responding device acquires, in block 902, a plurality of probe request messages originated from a plurality of requesting devices, each of the plurality of probe request messages comprising said information element indicating the support for the collision avoidance mechanism. In response to detecting that said information element comprised in the plurality of probe request messages and indicating that said plurality of requesting device support the collision avoidance, the responding device determines to execute the collision avoidance mechanism and reduce the number of transmitted probe response messages. As a consequence, the responding device prepares a probe response message that responds to the plurality of probe request messages and causes the transmission of the probe response message in block 904. In block 906, the requesting device 1, 2 acquires the probe response message transmitted by the responding device.

It should be noted that the procedure of FIG. 9 may be independent of the procedure of FIG. 2, for example. As a consequence, the indication of the support for the collision avoidance may be carried out without the responding device providing in the probe response message the information element that indicates whether the probe response is the response to a single or multiple probe requests. In such embodiments, the responding device may be configured not to explicitly indicate whether or not it has implemented the collision avoidance mechanism. Such embodiments, however, provide the advantage that the responding device has the option of executing the collision avoidance mechanism if it considers it feasible. Some criteria for whether or not to execute the collision avoidance are described below. However, in some embodiments, the procedures of FIGS. 2 and 9 are combined to provide an embodiment where the requesting device(s) indicate the support for the collision avoidance, and the responding device indicates with the information element included in the probe response message, whether or not it implements the collision avoidance mechanism.

The information element indicating the support for the collision avoidance by the requesting device may be comprised in a collision avoidance field of the probe request message, and the collision avoidance field may have the structure shown in Table 1 below.

TABLE 1

| Enhanced Scanning | Reserved |
|---|---|
| Bit 0 | Bits 1-7 |

The Enhanced Scanning field may be set to 1 or, generally, to a first value to indicate that the requesting device supports the probe response collision avoidance, while bit value 0 or, generally, a second value different from the first value may indicate that the requesting device does not support the probe response collision avoidance. It should be appreciated that the indication of the support of the probe response collision avoidance mechanism is not mandatory and, therefore, in some embodiments the requesting devices use conventional probe request messages. The support of the collision avoidance of the probe responses may be considered by the responding device when deciding the elimination or combination of the probe responses. When the requesting device indicates the support for the probe response collision avoidance, the responding device may safely apply the collision avoidance mechanism to those requesting devices that have indicated the support. Even if the Enhanced Scanning field is set to 0 or if the field is not present, the responding device may still use the collision avoidance mechanism, e.g. it may address the probe response to the unicast address of a requesting device not supporting the probe response collision avoidance. In such a case, the requesting device not supporting the collision avoidance may interpret the probe response as a conventional probe response, while the requesting device(s) supporting the collision avoidance may process the probe response as the requesting device 2 in the embodiment of FIG. 3. The other requesting devices not supporting the collision avoidance may consider the probe response as not intended to them. The responding device may then send a conventional probe response to such a requesting device or devices.

Table 2 below shows an embodiment of the information element inserted in the probe response message to indicate whether the probe response is a response to a single or multiple probe requests.

TABLE 2

| Response to Multiple Requests | Reserved |
|---|---|
| Bit 0 | Bits 1-7 |

The Respond to Multiple Requests field may be set to 1 or, generally, a first value to indicate that the probe response message is a response to multiple probe requests. The probe response may thus contain probe responses to requesting devices other than that identified by the destination address in a MAC header of the probe response. Otherwise, the field is set to 0 or, generally, to another value, to indicate that the probe response message is the response to a single probe request.

In an embodiment, the responding device may determine whether to respond to a probe request with a dedicated probe response message or to provide the probe response in a beacon frame. When the responding device decides to use the beacon frame, the responding device may insert into the beacon frame the following information element instead of that of Table 2:

TABLE 3

| Response to Multiple Requests | Beacon Replacing Probe Response(s) | Reserved |
|---|---|---|
| Bit 0 | Bit 1 | Bits 2-7 |

The Beacon Replacing Probe Responses may be set to 1 or, in general a first value, in the beacon frame to indicate that the beacon frame contains the relevant information elements of the probe response which is the response to at least one probe request frame. As a consequence, no dedicated probe response will be transmitted for that probe request. Otherwise the field may be set to 0 or, in general a second value different from the first value. If a probe response frame with Response to Multiple Requests field set to 1 has been sent during the previous beacon interval, this field set to 1 for the subsequent beacon frame transmission as well. This enables double verification that an arbitrary requesting device receives the probe response information. One criterion for providing the probe response in the beacon frame may be the duration to the next target beacon transmission time (TBTT) when the responding device supports the provision of the probe responses in the beacon frames. For example, if the responding device intends to transmit a beacon frame soon after the probe request, e.g. within the expiry time of the probe request, the responding device may transmit the beacon frame instead of the dedicated probe response. If the probe request requested specific information, the information may be added to the beacon frame.

In yet another embodiment, the responding device is configured to carry out the collision avoidance mechanism by responding to a single probe request with a probe response that is combined with another signalling message, e.g. the beacon frame. For example, when the responding device acquires a probe request a determined time duration before the next periodic transmission of the beacon frame, it may choose to insert the probe response to the beacon frame. The beacon frame may in this embodiment comprise at least the Beacon Replacing Probe Responses element of Table 3 so as to enable the requesting device to extract the probe response from the beacon frame. In this embodiment, the Response to Multiple Requests element may be omitted or it may be set to indicate that the probe response is a response to a single probe request.

Figure 4:
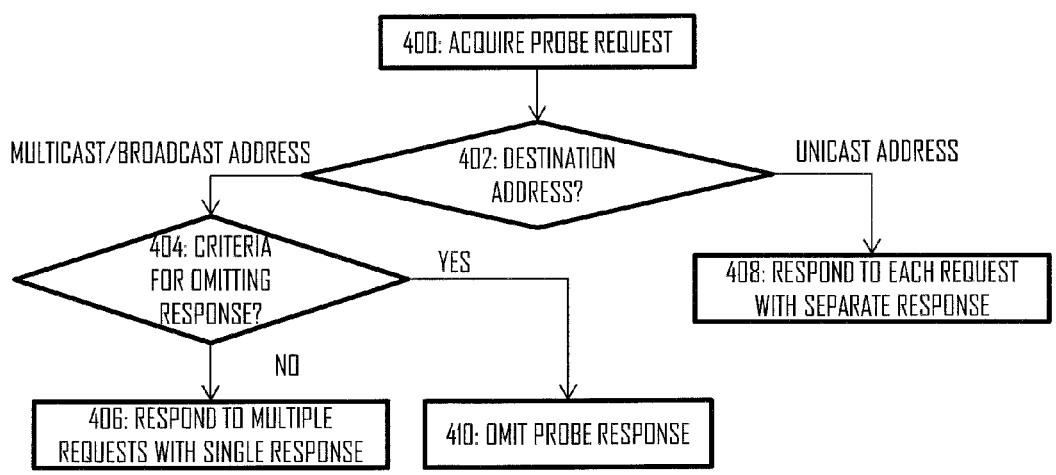
FIG. 4 is a flow diagram of a process for determining the response type in a responding device according to an embodiment of the invention.

Let us now consider processing of the probe requests in the responding device according to some embodiments of the invention. FIG. 4 illustrates a flow diagram of such a procedure. Referring to FIG. 4, the responding device acquires at least one probe request originated from a requesting device in block 400. Block 400 may also comprise determining conditions for the responding device defined in the probe request so as to determine whether or not the responding device is obliged to respond to the probe request. Examples of the conditions have been described above. Let us now assume that the responding device fulfils the conditions and, thus, is capable of providing the probe response. In block 402, the responding device extracts a receiver address from the probe request and analyses a type of the receiver address. If the receiver address of the probe request is an individual address of the responding device, the process may proceed to block 408 in which the responding device decides to respond to the probe request with a dedicated probe response. As a consequence, the responding device may insert into the probe response the information element indicating that the probe response is a probe response only to a single probe request. The responding device may then insert into a receiver address field of the probe response a MAC address of the requesting device from which the probe request was originated in block 400. On the other hand, if the receiver address of the probe request is a multicast address or a broadcast address, the process may proceed to a branch where the responding device decides to provide a probe response which is a probe response to the probe request and to at least one other probe request (block 406). As a consequence, the responding device may implement a rule according to which the responding device prefers to respond to a probe request addressed to a unicast address with the dedicated probe response and to respond to a probe request addressed to a multicast or broadcast address with a probe response that responds to multiple probe requests. The reasoning may be that the responding device determines from the address type of the probe request whether or not there will be high signalling traffic on the channel of the probe request. If the probe request is addressed to the unicast address, there will be only a single probe response, while the probe request addressed to a multicast or broadcast address may cause transmission of a plurality of probe responses. The probe request and the probe response(s) may be configured to be transferred on the same channel, e.g. the same frequency channel.

The process of FIG. 4 may proceed directly from block 402 to block 406, if so determined. However, FIG. 4 illustrates another embodiment in which the responding device provides an optional step between blocks 402 and 406. Block 404 may be applied, if the responding device utilizes a sub-process in which the responding device determines whether or not to respond to the probe request addressed to the multicast, broadcast address, or group address. In block 404, the responding device determines whether the criteria for omitting the probe response are fulfilled. If the criteria for omitting the response are fulfilled, the process proceeds to block 410 in which the responding device omits the transmission of the probe response. On the other hand, if the criteria for transmitting the probe response are fulfilled in block 404, the process may proceed to block 406. Now, let us consider some examples of the criteria the responding device may use in block 404. Depending on the embodiment, the responding device may consider all the following criteria or a subset of them. Similarly depending on the embodiment, when the responding device considers a plurality of criteria, all of the criteria may need to be fulfilled to proceed to block 410 or only some of the criteria needs to be fulfilled, e.g. at least one criterion. The criteria may include at least one of the following criteria: a number of neighbouring wireless networks detected by the responding device, a number of other responding devices, a frequency of probe request receptions, an amount of traffic on a radio channel, a link quality associated with at least one pending probe request, a number of pending probe requests, duration from the reception of the probe request message, probability to carry out association for frame transmission as a result of the probe response, and an available capacity of the wireless apparatus.

The responding device may constantly monitor the radio channel and detect any beacon and/or advertisement signals transmitted by neighbouring wireless networks, e.g. BSSs. For example, if the number of detected neighbouring networks is above a given threshold, the responding device may choose not to respond to every probe request, e.g. it may carry out block 410 for a determined portion of all the received probe requests. The responding device may use this statistical approach to reduce the total number of transmitted probe responses. The responding device may also determine the type of the neighbouring wireless networks, e.g. if the number of neighbouring networks that are able to serve the requesting device is above the threshold, the responding device may carry out block 410 for a determined portion of the received probe requests. In general, the responding device may reduce the number of transmitted probe responses when the criteria are satisfied, but it may be configured to respond to at least some of the received probe requests. The same applies to the frequency of the probe request receptions, e.g. when the frequency is above a given threshold, the probe responses are reduced. In an embodiment, the criterion is the total number of detected probe requests, while in another embodiment the criterion is the frequency of probe requests concerning the responding device itself. When the number of pending probe requests concerning the responding device is above a given threshold, the responding device may choose to reduce the number of transmitted probe responses by providing the single response to the multiple requests and/or by omitting some of the responses.

One criterion may be the number of responses statistically resulting in an association with the responding device. The responding device may monitor the ratio between the number of probe requests and the number of associations. This criterion may be considered from load balancing point of view, for example. If the ratio is high indicating that a probe response is likely to result in a new association and if the available capacity of the responding device is low, the responding device may choose to reduce the number of probe responses.

One criterion may be the cost of the network access, e.g. an operator of a wireless network provided by the responding device and charging for the use may prefer that the responding device responds to every probe request.

One criterion may be the duration from the reception probe request and the number of detected probe responses to the probe request. For example, if the duration from the probe request exceeds a timing threshold and no probe responses for the probe request have been detected, the responding device may transmit the probe response. This ensures that the requesting device receives in time at least one probe response that meets the conditions of the probe request.

One criterion may be the quality of the service and/or the radio link between the requesting device and the responding device. This may be determined from a reception power of the probe request, for example. For example, if there are other responding devices that operate with the same SSID or, in general, an alternative responding device for probe request, and if the radio link between the responding device and the requesting device is poor, the responding device may choose not to respond. Similarly, the responding device may choose not to respond, if the amount of traffic in the channel is high, e.g. above a threshold. One criterion may relate to the capacity of the responding device and the type of the current traffic it provides. For example, if the capacity is low and the current traffic has high quality of service (QoS) demands, the responding device may choose not to respond. One criterion of the capacity may also be the capacity of a backbone of the responding device, e.g. a capacity of a connection from the responding device onwards.

An embodiment configures the responding device to proibide the probe response frame as an acknowledgement to the probe request frame. The responding device may transmit the probe response to a requesting device that has not yet received an acknowledgement or a probe response. This type of probe response frame indicates that the responding device has received the probe request and that the requesting device should not retransmit the probe request.

An embodiment provides an alternative response, e.g. as an additional block to which the process of FIG. 4 may proceed from block 404. The alternative response may comprise a response message that signals to the requesting device that the responding device has correctly received the probe request, e.g. it may be a probe acknowledgment message comprising less information than the probe response message. In this case, the probe acknowledgment message addressed to the requesting device may indicate that the responding device has received the probe request and that the requesting device should not retransmit the probe request. The probe acknowledgment provides a type of reduced probe response message, thus providing the response to a group-addressed probe request and yet reducing the signaling overhead.

In an embodiment, the responding device uses at least some of the above-mentioned criteria when determining whether to respond to a single or multiple probe requests with the probe response and/or when determining whether to respond with a dedicated probe response or to include the probe response in the beacon frame.

In an embodiment, the responding device uses at least some of the above-mentioned criteria when determining whether to respond with the probe response to a single or multiple probe requests addressed to a unicast address.

In an embodiment, the responding device prioritizes responses to the probe requests addressed to unicast addresses over the probe requests addressed to multicast, broadcast, or group addresses. The prioritization may be based on the access categories of the probe requests, e.g. the unicast-addressed probe requests may have a higher priority than the other probe requests. The responding device may on the basis of at least one of the above-mentioned criterion decide to reduce the number of probe responses to the multicast, broadcast, or group addressed probe requests so as to maintain the higher grade of probe responses to the unicast-addressed probe requests.

Figure 5:
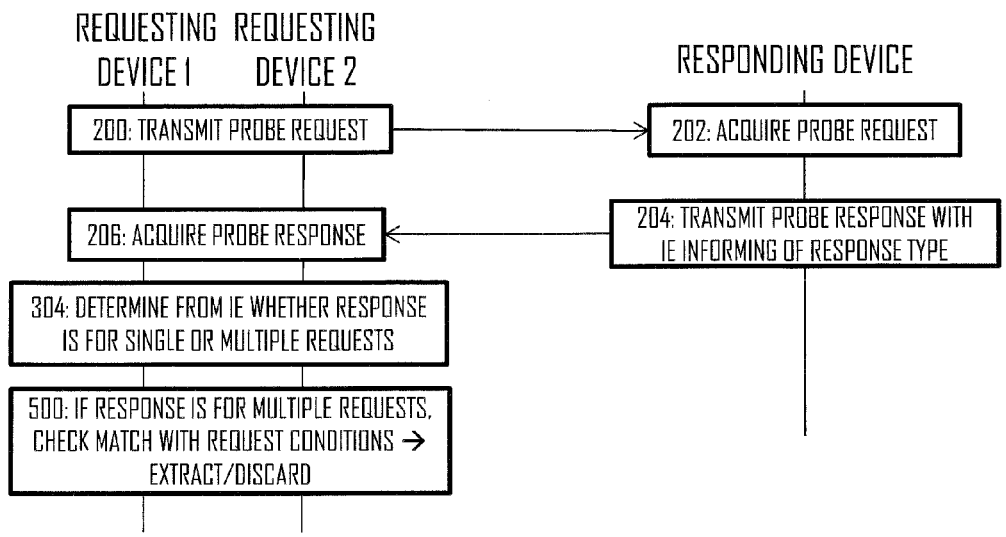
FIGS. 5 and 6 are signalling diagrams of processes for enabling a requesting device to determine the type of probe responses according to some embodiments of the invention.

FIG. 5 illustrates an embodiment for enabling the requesting device to determine from a probe response that is the response to the multiple probe requests, whether or not the probe response addresses the probe request the requesting device itself has transmitted. Blocks 200 to 206 correspond to those described above. In block 206, the requesting device 1, 2 acquires the probe response, and it determines in block 304 whether the probe response is a response to multiple probe requests. Let us now assume that it is. In block 500, the requesting device 1, 2 then carries out a similar procedure as the responding device does when it evaluates whether to respond to the probe request or not. The requesting device checks in block 500 whether the probe response is from a responding device that matches with the conditions the requesting device defined in the probe request. For example, the requesting device may compare the address and/or SSID included in the conditions defined in the probe request with the source address and/or SSID included in the probe response. If the result of the comparison is a match between the conditions and the probe response, the requesting device may determine that the probe response is targeted to it and it may extract the contents of the probe response. On the other hand, if the result of the comparison is a mismatch between the conditions and the probe response, the requesting device may determine that the probe response is not targeted to it and it may discard the probe response.

Figure 6:
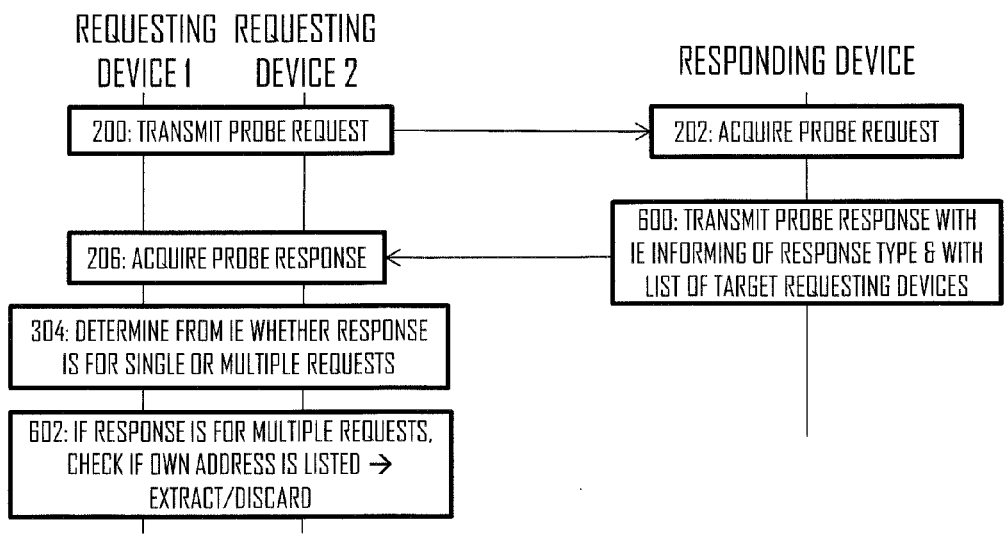

FIG. 6 illustrates another embodiment for enabling the requesting device to determine from a probe response that is the response to the multiple probe requests, whether or not the probe response addresses the probe request the requesting device itself has transmitted. Blocks 200 to 206 and 304 correspond to those described above. Now, the responding device inserts into the probe response a list of target devices to which the probe response is intended (block 600). The list may be provided in the form of a list of MAC addresses of the target devices, but it should be appreciated that any other identifiers may be used instead. Upon receiving the probe response in block 206 and carrying out block 304, the requesting device 1, 2 may determine from the list of target devices whether or not the probe response is intended for the requesting device 1, 2 (block 602). If the MAC address or, in general, identifier of the requesting device 1, 2 is contained in the probe response, the requesting device may determine that the probe response is targeted to it and it may extract the contents of the probe response. On the other hand, if the identifier of the requesting device 1, 2 is not contained in the probe response (block 602), the requesting device may determine that the probe response is not targeted to it and it may discard the probe response.

The above-described active scanning procedure involving the probe requests and the probe responses may utilize a QoS enhancement in which an access category is assigned to the probe request and probe response messages. For example, a probe request addressed to a unicast address and associated probe response may be given a higher priority than a probe request addressed to a multicast, broadcast, or group address and associated probe response. In an embodiment, the probe response that is the response to a multiple probe requests may be categorized as a high priority message, e.g. when using two priority levels the probe response may be assigned with the higher priority level.

Figure 7:
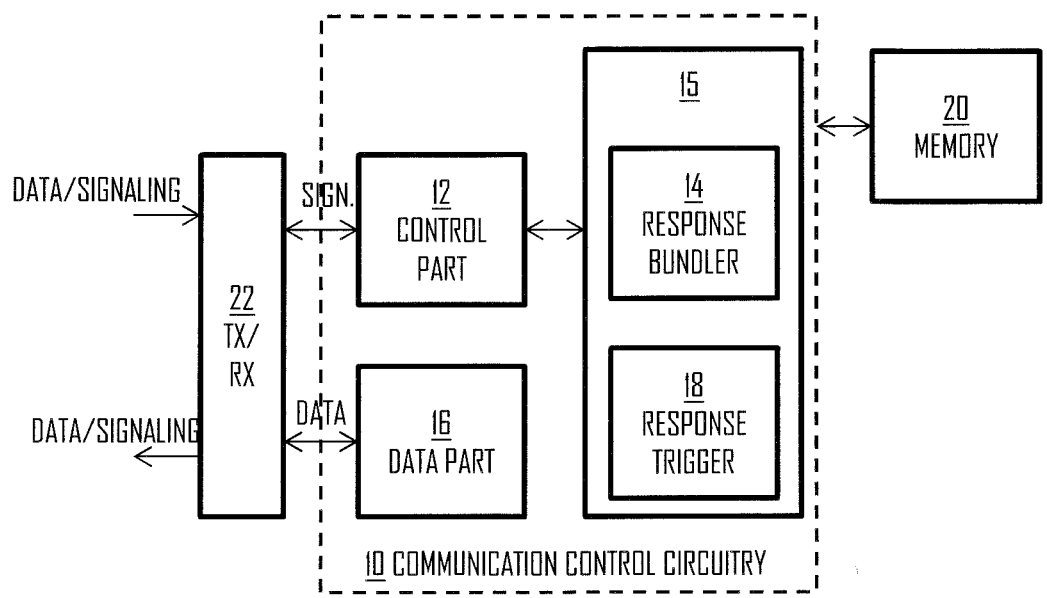
FIGS. 7 and 8 illustrate block diagrams of apparatuses comprised in the requesting device (FIG. 8) and the responding device (FIG. 7) according to some embodiments of the invention.

FIG. 7 illustrates an embodiment of an apparatus comprising means for carrying out the above-mentioned functionalities of the wireless apparatus configured to process received request messages and respond to then, if so determined. The apparatus of FIG. 7 may thus be considered as a structural embodiment of the above-mentioned responding device, and it may be comprised in a wireless apparatus. The apparatus may be a wireless apparatus of an IEEE 802.11 network or another wireless network, e.g. an AP. The apparatus may be a computer (PC), a laptop, a tablet computer, a cellular phone, a palm computer, a fixed base station operating as the AP, or any other wireless apparatus provided with radio communication capability. In another embodiment, the apparatus is comprised in such a wireless apparatus, e.g. the apparatus may comprise a physical circuitry, e.g. a chip, a processor, a micro controller, or a combination of such circuitries in the wireless apparatus.

The apparatus may comprise a communication controller circuitry 10 configured to control the communications in the wireless apparatus. The communication controller circuitry 10 may comprise a control part 12 handling control signalling communication with respect to transmission, reception, and extraction of control or management frames including the probe request messages and the probe response messages, as described above. The communication controller circuitry 10 may further comprise a data part 16 that handles transmission and reception of payload data during transmission opportunities of the wireless apparatus (transmission) or transmission opportunities of other wireless apparatuses (reception). The communication controller circuitry 10 may further comprise a request processor circuitry 15 configured to carry out at least some of the request processing procedures described above. The request processor circuitry 15 may be configured to acquire a probe request message through the control part 12 and to process the probe request message so as to determine whether or not to respond to the probe request and/or the type of the probe response message to be used. For the former purpose, the request processor circuitry 15 may comprise a response trigger circuitry 18 configured to assess at least some of the above-mentioned conditions and/or criteria so as to determine whether or not the preparation of the probe response should be triggered. Upon determining that the probe request should be responded with the probe response, the response trigger circuitry 18 may be configured to trigger the preparation of the probe response message by calling a response bundler circuitry 14 to carry out the preparation of the probe response message. The response bundler circuitry 14 may be configured to determine whether to respond to only one probe request or to respond to multiple probe requests with a single probe response. Depending on the decision, the response bundler circuitry 14 may configure the control part 12 to prepare a probe response comprising the above-mentioned information element of Table 2 or 3 indicating the type of the probe response message. The control part 12 may then determine whether to transmit the probe response as the dedicated probe response message or to include the probe response in a beacon frame or another periodically transmitted control frame.

The circuitries 12 to 18 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 18 or all of them.

The apparatus may further comprise a memory 20 storing computer programs (software) configuring the apparatus to perform the above-described functionalities of the wireless apparatus. The memory 20 may also store communication parameters and other information needed for the wireless communications, e.g. the rules for determining whether or not to respond to multiple probe requests with a single probe response. The apparatus may further comprise radio interface components 22 providing the apparatus with radio communication capabilities within its wireless network and/or with other wireless networks. The radio interface components 22 may comprise standard well-known components such as amplifier, filter, frequency-converter, (de)modulator, and encoder/decoder circuitries and one or more antennas. The apparatus may further comprise a user interface enabling interaction with the user of the communication device. The user interface may comprise a display, a keypad or a keyboard, a loudspeaker, etc.

In an embodiment, the apparatus carrying out embodiments of the invention in the wireless apparatus comprises at least one processor and at least one memory including a computer program code, wherein the at least one memory and the computer program code are configured, with the at least one processor, to cause the apparatus to carry out the functionality of the responding device in any one of the processes of FIGS. 2 to 6 and 9. Accordingly, the at least one processor, the memory, and the computer program code form processing means for carrying out embodiments of the present invention in the wireless communication apparatus processing request messages.

Figure 8:
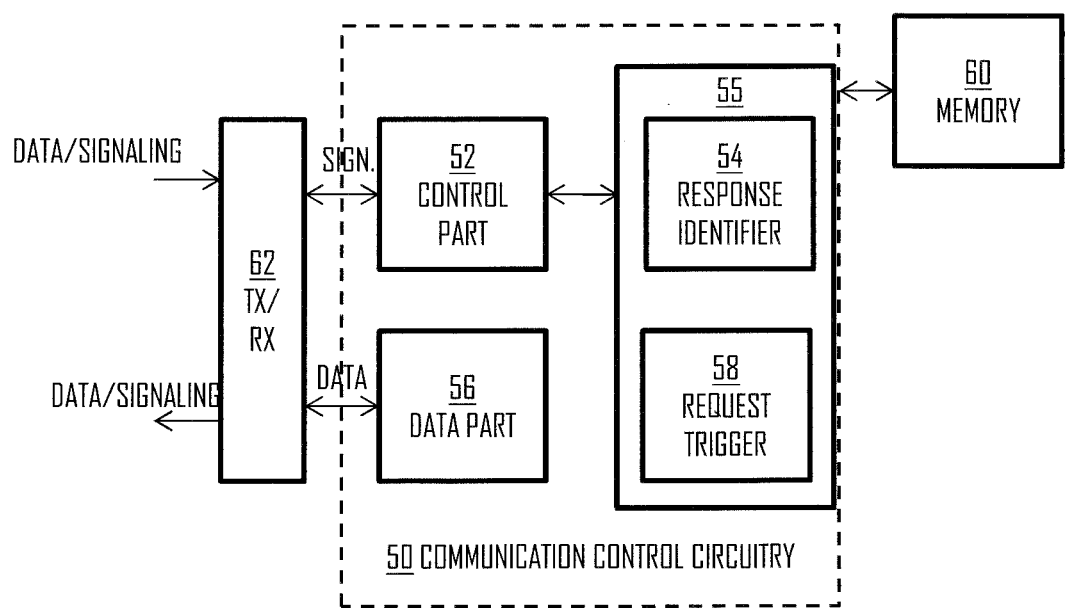

FIG. 8 illustrates an embodiment of an apparatus comprising means for carrying out the above-mentioned functionalities of the requesting device configured to carry out an active scanning process involving the request messages and response messages. The apparatus may be a wireless apparatus of an IEEE 802.11 network or another wireless network, e.g. a STA. The apparatus may be a computer (PC), a laptop, a tablet computer, a cellular phone, a palm computer, or any other apparatus provided with radio communication capability. In another embodiment, the apparatus is comprised in such a wireless apparatus, e.g. the apparatus may comprise a physical circuitry, e.g. a chip, a processor, a micro controller, or a combination of such circuitries in the wireless apparatus.

The apparatus may comprise a communication controller circuitry 50 configured to control the communications in the wireless apparatus. The communication controller circuitry 50 may comprise a control part 52 handling control signalling communication with respect to transmission, reception, and extraction of control or management frames including the request messages and the response messages, as described above. The communication controller circuitry 50 may further comprise a data part 56 that handles transmission and reception of payload data during transmission opportunities of the wireless apparatus (transmission) or transmission opportunities of other wireless apparatuses (reception). The communication controller circuitry 50 may further comprise an active scanning controller circuitry 55. The active scanning controller circuitry 55 may comprise a request trigger circuitry 58 configured to trigger the active scanning procedure. As a consequence, the request trigger circuitry 58 may trigger the control part 52 to prepare the above-described probe request message. The control part 52 may then include in the probe request message the information element of Table 1. After transmitting the probe request, the control part 52 may monitor for probe response messages and, upon detecting a probe response message, the control part may forward the detected probe response message to a response identifier circuitry 54. Upon acquiring the probe response message, the response identifier circuitry 54 may determine whether or not the probe response message is a probe response to the transmitted probe request message according to any one of the above-described embodiments (block 208, 304, 306, 500, 602). Upon acquiring the verification that the probe response message is the probe response to the transmitted probe request message, the active scanning controller circuitry 55 may extract the contents of the probe response message. Otherwise, it may discard the probe response message.

The circuitries 52 to 58 of the communication controller circuitry 50 may be carried out by the one or more physical circuitries or processors. In practice, the different circuitries may be realized by different computer program modules. Depending on the specifications and the design of the apparatus, the apparatus may comprise some of the circuitries 52 to 58 or all of them.

The apparatus may further comprise a memory 60 to store computer programs (software) configuring the apparatus to perform the above-described functionalities of the requesting device. The memory 60 may also store communication parameters and other information needed for the wireless communications, e.g. the rules for processing the request and response messages. The apparatus may further comprise radio interface components 62 providing the apparatus with radio communication capabilities within the BSS and/or with other BSSs. The radio interface components 62 may comprise standard well-known components such as amplifier, filter, frequency-converter, (de)modulator, and encoder/decoder circuitries and one or more antennas. The apparatus may further comprise a user interface enabling interaction with the user of the communication device. The user interface may comprise a display, a keypad or a keyboard, a loudspeaker, etc.

In an embodiment, the apparatus carrying out the embodiments of the invention in the wireless apparatus comprises at least one processor and at least one memory including a computer program code, wherein the at least one memory and the computer program code are configured, with the at least one processor, to cause the apparatus to carry out the functionality of the requesting device 1, 2 in any one of the processes of FIGS. 2, 3, 5, 6, and 9. Accordingly, the at least one processor, the memory, and the computer program code form processing means for carrying out embodiments of the present invention in the apparatus functioning in the requesting device.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit or applications processor integrated circuit (ASIC) for the apparatus according to an embodiment of the invention.

The processes or methods described in FIGS. 2 to 6 and 9 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to wireless communication systems defined above but also to other suitable communication systems. The protocols used, the specifications of wireless communication systems, their network elements and terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
    acquiring, in a wireless apparatus a plurality of probe request messages originated from a plurality of requesting wireless apparatuses, each of the plurality of probe request messages comprising an information element that indicates that each of the plurality of requesting wireless apparatuses supports a collision avoidance mechanism;
    in response to detecting that said information element comprised in the plurality of probe request messages and indicating said support for the collision avoidance mechanism, causing transmission of a probe response message that responds to the plurality of probe request messages;
    determining whether or not at least some of the probe request messages are addressed to a broadcast address, a multicast address, or a unicast address;
    if the probe request message addressed to the broadcast address or the multicast address are detected, causing transmission of said robe response messa e that is the robe response to the plurality of probe request messages; and
    if the probe request message is addressed to the unicast address, causing transmission of a probe response message that is the probe response to a single probe request message.

2. The method of claim 1, wherein the probe response message comprises an information element that indicates whether the probe response message is a probe response to a single probe request message or to a plurality of probe request messages.

3. The method of claim 1, further comprising: addressing the probe response message to a unicast address of a requesting wireless apparatus.

4. A method comprising:
    causing, in a requesting wireless apparatus, transmission of a probe request message from the requesting wireless apparatus, wherein the probe request message comprises an information element that indicates that the requesting wireless apparatus supports a collision avoidance mechanism that enables a responding wireless apparatus to reduce a number of probe response messages by responding to a plurality of probe request messages with a single probe response message; and
    acquiring, in the requesting wireless apparatus, a probe response message transmitted by a responding wireless apparatus as a response to the probe request message;
    where the probe response message comprises an information element that indicates whether the probe response message is a probe response to a single probe request message or to a plurality of probe request messages; and
    if the information element indicates that the probe response message is the probe response to the plurality of request messages, processing the probe response message as a probe response that is related to the transmitted request message; and
    if the information element indicates that the probe response message is the probe response to the single probe request message, processing the probe response message as a probe response that is not related to the transmitted request message.

5. The method of claim 4, further comprising:
    if the information element indicates that the probe response message is the probe response to the plurality of request messages, extracting information on a wireless network from the probe response message; and
    if the information element indicates that the probe response message is the probe response to the single probe request message, discarding the probe request message and continuing to monitor for the probe response message that is related to the transmitted request message.

6. The method of claim 4, wherein the probe response message is addressed to a unicast address of another requesting wireless apparatus, a broadcast address, or a multicast address.

7. An apparatus comprising: at least one processor; and at least one memory including computer program code, wherein the at least one memory and the computer program code are configured, with the at least one processor, to cause the apparatus to acquire a plurality of probe request messages originated from a plurality of requesting wireless apparatuses, each of the plurality of probe request messages comprising an information element that indicates that each of the plurality of requesting wireless apparatuses supports a collision avoidance mechanism;
    in response to detecting said information element comprised in the plurality of probe request messages and indicating said support for the collision avoidance mechanism, cause transmission of a probe response message that responds to the plurality of probe request messages; and
    where the at least one memory and the computer program code are configured, with the at least one processor, to cause the apparatus to provide the probe response message in the form of a periodically transmitted beacon frame instead of a dedicated probe response frame.

8. The apparatus of claim 7, wherein the probe response message comprises an information element that indicates whether the probe response message is a probe response to a single probe request message or to a plurality of probe request messages.

9. The apparatus of claim 7, wherein the at least one memory and the computer program code are configured, with the at least one processor, to cause the apparatus to address the probe response message to a unicast address of a requesting wireless apparatus.

10. The apparatus of claim 7, wherein the at least one memory and the computer program code are configured, with the at least one processor, to cause the apparatus to:

determine whether or not at least some of the probe request message are addressed to a broadcast address, a multicast address, or a unicast address;

if the probe request message addressed to the broadcast address or the multicast address are detected, cause transmission of said probe response message that is the probe response to the plurality of probe request messages; and if the probe request message is addressed to the unicast address, cause transmission of a probe response message that is the probe response to a single probe request message.

11. The apparatus of claim 7, wherein the at least one memory and the computer program code are configured, with the at least one processor, to cause the apparatus to:

determine on the basis of pending probe requests, a set of requesting wireless apparatuses to be provided with a probe response; and insert into the probe response message a list of identifiers associated with the determined requesting wireless apparatuses to which the probe response message is targeted.

12. An apparatus comprising: at least one processor; and at least one memory including computer program code, wherein the at least one memory and the computer program code are configured, with the at least one processor, to cause the apparatus to:

cause transmission of a probe request message, wherein the probe request message comprises an information element that indicates that the apparatus supports a collision avoidance mechanism that enables a responding wireless apparatus to reduce a number of probe response messages by responding to a plurality of probe request messages with a single probe response message;

acquiring a probe response message transmitted by the responding wireless apparatus as a response to the probe request message; and where the probe response message comprises an information element that indicates whether the probe response message is a probe response to a single probe request message or to a plurality of probe request messages, and wherein the at least one memory and the computer program code are configured, with the at least one processor, to cause the apparatus to:

if the information element indicates that the probe response message is the probe response to the plurality of request messages, process the probe response message as a probe response that is related to the transmitted request message; and if the information element indicates that the probe response message is the probe response to the single probe request message, process the probe response message as a probe response that is not related to the transmitted request message.

13. The apparatus of claim 12, wherein the at least one memory and the computer program code are configured, with the at least one processor, to cause the apparatus to:

if the information element indicates that the probe response message is the probe response to the plurality of request messages, extract information on a wireless network from the probe response message; and if the information element indicates that the probe response message is the probe response to the single probe request message, discard the probe request message and continuing to monitor for the probe response message that is related to the transmitted request message.

14. The apparatus of claim 12, wherein the probe response message is addressed to a unicast address of another requesting wireless apparatus, a broadcast address, or a multicast address.

15. The apparatus of claim 12, wherein the at least one memory and the computer program code are configured, with the at least one processor, to cause the apparatus to:

insert into the probe request message at least one criterion that a responding wireless apparatus must satisfy in order to transmit said probe response message;

if the information element indicates that the probe response message is the probe response to the plurality of request messages, determine from contents of the probe request message whether or not it provides a match with said at least one criterion;

if the probe response message provides a match with said at least one criterion, process the probe response message as a probe response that is related to the transmitted request message; and if the probe response message does not provide a match with said at least one criterion, process the probe response message as a probe response that is not related to the transmitted request message.

16. The apparatus of claim 12, wherein the probe response message comprises a list of identifiers associated with requesting wireless apparatuses to which the probe response message is targeted, if the probe response message is the probe response to the plurality of request messages, and wherein the at least one memory and the computer program code are configured, with the at least one processor, to cause the apparatus to:

check for the presence of an identifier of the requesting wireless apparatus in the probe response message;

if the probe response message comprises an identifier of the requesting wireless apparatus, process the probe response message as a probe response that is related to the transmitted request message; and if the probe response message does not comprise the identifier of the requesting wireless apparatus, process the probe response message as a probe response that is not related to the transmitted request message.

17. The apparatus of claim 12, wherein the at least one memory and the computer program code are configured, with the at least one processor, to cause the apparatus to acquire the probe response comprised in a periodic beacon frame.

* * * * *

UNITED STATES PATENT AND TRADEMARK OFFICE
CERTIFICATE OF CORRECTION

PATENT NO.        : 9,185,725 B2  
APPLICATION NO.   : 13/327070  
DATED             : November 10, 2015  
INVENTOR(S)       : Kneckt et al.

Page 1 of 1

It is certified that error appears in the above-identified patent and that said Letters Patent is hereby corrected as shown below:

IN THE CLAIMS

Claim 1, col. 17, line 45 "messa e" should be deleted and --message-- should be inserted.

Claim 1, col. 17, line 46 "robe" should be deleted and --probe-- should be inserted.

Signed and Sealed this  
Second Day of February, 2016

Michelle K. Lee  
*Director of the United States Patent and Trademark Office*